Patented Aug. 18, 1936

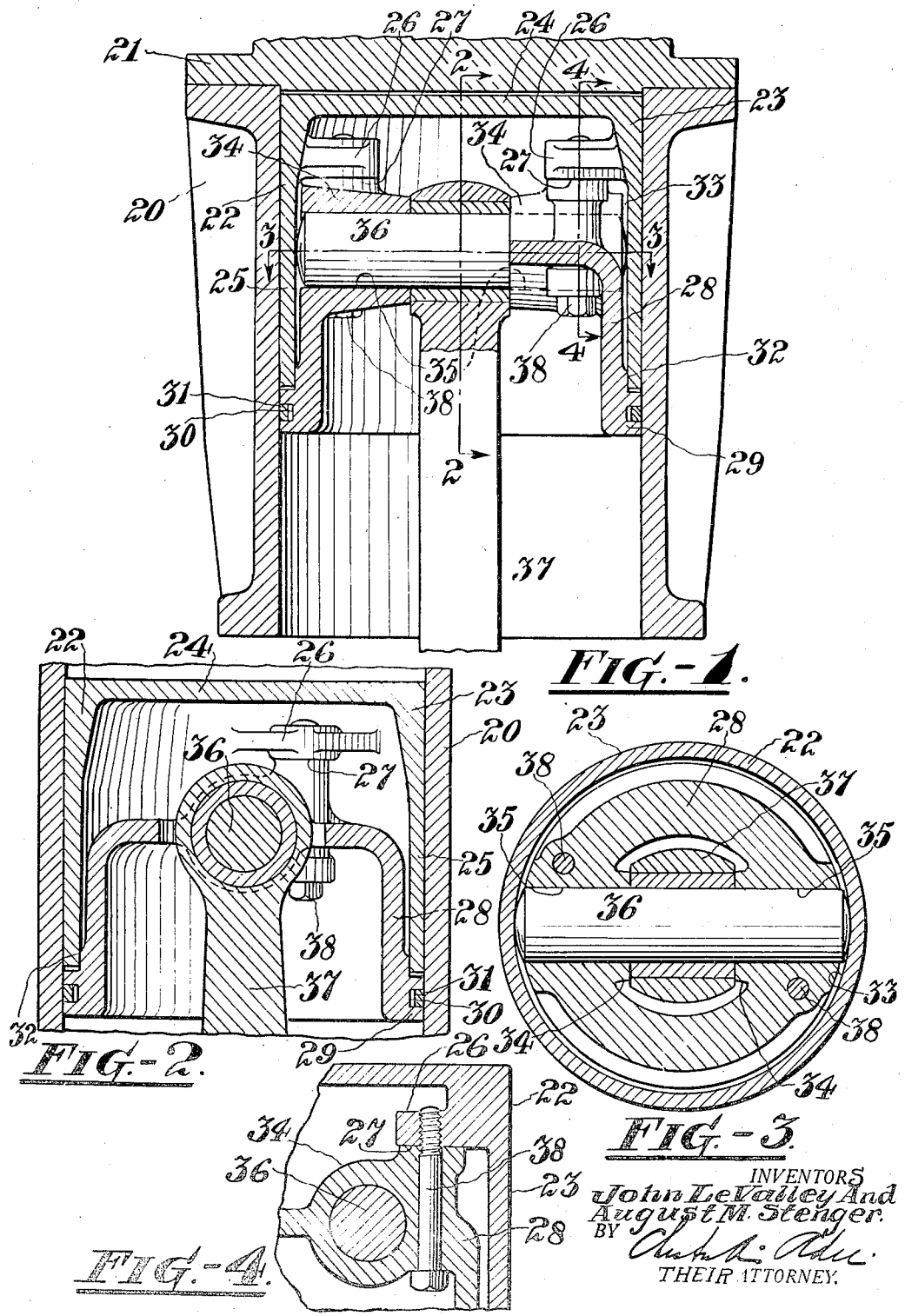

2,051,305

UNITED STATES PATENT OFFICE 2,051,305

PISTON

John Le Valley and August M. Stenger, Painted Post, N. Y., assignors to Ingersoll-Rand Company, Jersey City, N. J., a corporation of New Jersey Application March 7, 1935, Serial No. 9,742

1 Claim. (Cl. 309—16)

This invention relates to pistons, and more particularly to a composite piston of which the component parts may be readily assembled and disassembled.

One object of the invention is to avoid mechanical distortion of the portion of the piston which cooperates with the cylinder wall.

Another object is to minimize the transmission of heat from the piston head to the portions of the piston constituting bearings for the wrist pin.

Still another object is to assure accuracy in the alignment of the component parts of the piston.

Other objects will be in part obvious and in part pointed out hereinafter.

In the drawing illustrating the invention and in which similar reference numerals refer to similar parts, Figure 1 is an elevation, partly in section and partly broken away, of a piston constructed in accordance with the practice of the invention and a cylinder wherein it is arranged, Figure 2 is an elevation taken through Figure 1 on the line 2—2, Figure 3 is a transverse view taken through Figure 1 on the line 3—3 looking in the direction indicated by the arrows, and Figure 4 is a view similar to Figure 2 taken through Figure 1 on the line 4—4 looking in the direction indicated by the arrows.

Referring more particularly to the drawing, 20 designates a cylinder, 21 a head therefor, and 22 a piston constructed in accordance with the practice of the invention and arranged in the cylinder 20.

In the form of the invention illustrated the piston comprises an outer imperforate member 23 which bears slidably on the wall of the cylinder 20 and comprises the usual head 24 and skirt designated 25. The wall of the latter is preferably of substantially uniform thickness throughout the major portion of its length and from its open end.

On the inner surface and intermediate the ends of the member 23 are a plurality of lugs 26, two in the present instance, which are integral portions of the member 23. The lugs are provided with seating surfaces 27 on the sides confronting the open end of the skirt 25 to serve as abutments for a cup-shaped member 28 extending into the member 23.

The outer portion of the member 28 is in the form of a lateral flange 29, of substantially the same diameter as the member 23, and which may have an annular groove 30 for a sealing ring 31. The portion of the peripheral surface of the member 28 adjacent the flange 29 constitutes a bearing surface 32 which fits snugly into the end of the skirt 25 to maintain the member 28 coaxial with respect to the member 23. The diameter of the remainder or that portion of the member 28 lying inwardly of the surface 32 is preferably smaller than the inner diameter of the skirt 25 to provide a clearance 33 between these elements and thereby minimize the path of heat transmission between the members.

On the inner end of the member 28 are a pair of transverse bosses 34 having bores 35 for the accommodation of a wrist pin 36 extending through a connecting rod 37. The wrist pin lies entirely within the member 28 and the skirt 25 of the member 23 may thus act as an abutment for the ends of the wrist pin to retain it against endwise movement.

Preferably a slight amount of clearance exists between the open end of the skirt 25 and the flange 29 so that inward movement of the member 28 within the member 23 is limited only by the lugs 26 to which the member 28 is fixedly secured as by means of screws 38 extending through the bosses 34 and being threaded into the lugs 26.

In practice, the present invention has been found to be highly efficient and satisfactory. By isolating the portion of the piston assembly containing the wrist pin bearings from the heated portions of the piston the wrist pin and its bearings may be readily maintained in a well lubricated state, and the viscosity of the lubricant will remain high as compared with that in structures wherein the heat to which the piston head is exposed may follow a wide and comparatively uninterrupted path to the bearings. A further advantage of the present invention is that the portion of the piston assembly comprising the wrist pin bearings may be secured to the outer piston member without causing mechanical distortion of either.

We claim:

A piston comprising inner and outer cup-shaped members having cooperating portions adjacent the open end of the outer member to maintain the members in coaxial relationship, said cooperating portions constituting the only area of contact between the outer member and the periphery of the inner member, bosses on the inner member having holes for a wrist pin, lugs on the inner surface and intermediate the ends of the outer member spaced with respect to each other and seating against the inner end of the inner member, bolts for securing the inner member to the lugs, a lateral flange on the inner member of the same diameter as the outer member and being spaced with respect to the outer member, there being an annular groove in the flange, and a sealing ring in the groove.

JOHN LE VALLEY.
AUGUST M. STENGER.